United States Patent [19]

Mutschler

[11] 3,870,421
[45] Mar. 11, 1975

[54] TUBULAR NIB-TYPE PEN WITH A SCREWED-IN NIB

[75] Inventor: Otto Mutschler, Heidelberg, Germany

[73] Assignee: J. S. Staedtler, Nurnberg, Germany

[22] Filed: Dec. 1, 1972

[21] Appl. No.: 311,127

[30] Foreign Application Priority Data
Dec. 8, 1971 Germany............................ 2160835

[52] U.S. Cl. .............................................. 401/259
[51] Int. Cl. .............................................. B43k 8/00
[58] Field of Search ........................... 401/258–260, 401/265

[56] References Cited
UNITED STATES PATENTS
2,401,167  5/1946  Kovacs................................ 401/259
3,539,269  11/1970  Dahle................................. 401/259
FOREIGN PATENTS OR APPLICATIONS
1,911,950  9/1970  Germany............................ 401/259

Primary Examiner—Lawrence Charles
Attorney, Agent, or Firm—Hane, Baxley & Spiecens

[57] ABSTRACT

A tubular nib-type pen comprises a nib adapted to be screwed into a holding shank and with a helical vent channel which is separate from an attachment screw thread and, looked at from the paper engaging end of the nib, lies in front of the attachment screw thread. The venting channel serves as an equalisation chamber and is connected with the external atmosphere. The holding shank has a female screw thread, which with an attachment screw thread at the rear end of the nib forms a screw connection. In front of the attachment screw thread of the nib on a cylindrical shank of the nib a helical groove is provided which has the same pitch as the attachment screw thread and is offset in relation to the attachment screw thread by an uneven multiple of half its pitch.

3 Claims, 1 Drawing Figure

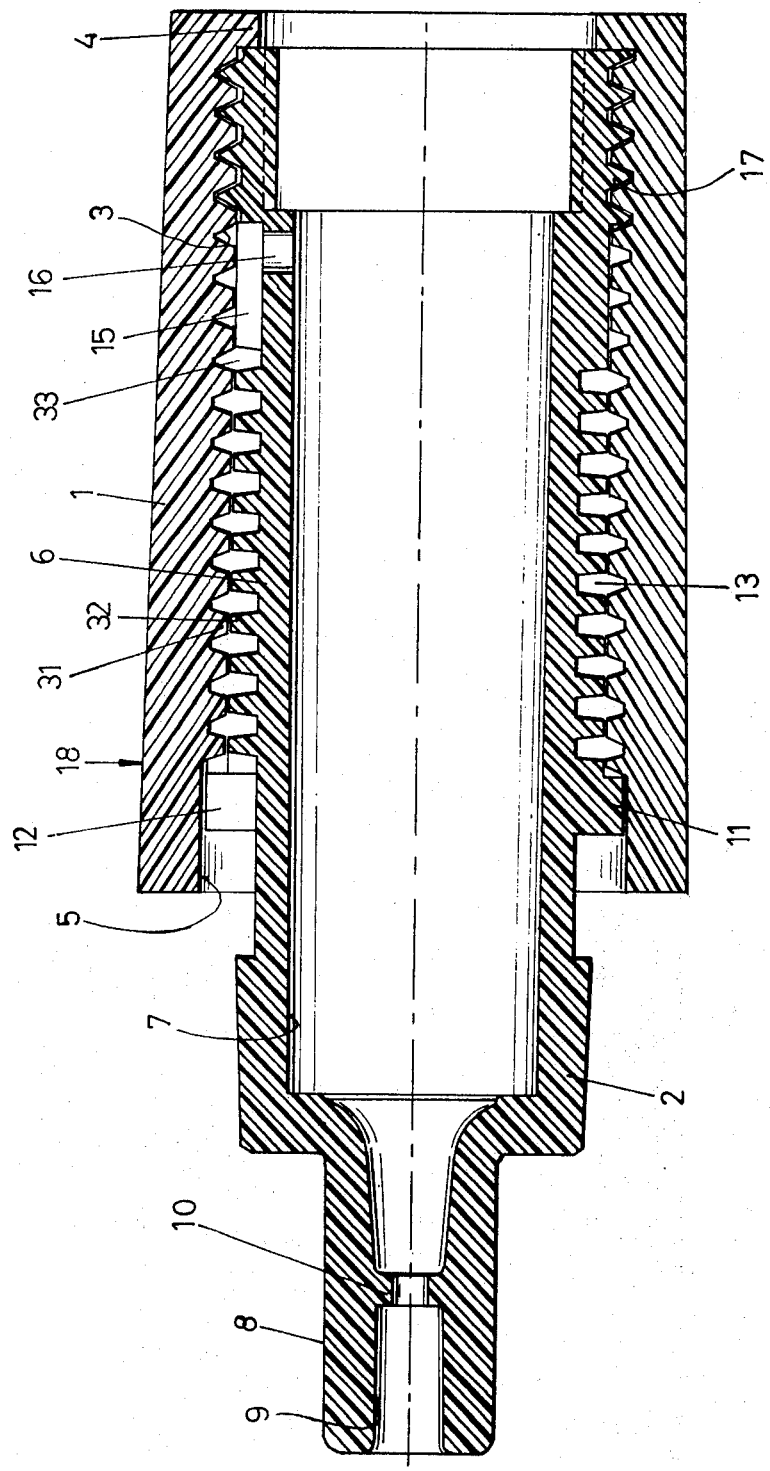

TUBULAR NIB-TYPE PEN WITH A SCREWED-IN NIB

BACKGROUND OF INVENTION

1. Field to which invention relates

The present invention relates to a tubular nib-type pen with a nib which can be screwed into a holding shank and a helical venting passage which is separated from a fixing screw thread as looked at from the writing end of the nib, lies in front of the attachment screw thread, is connected with the outside atmosphere and serves as an equalization chamber.

2. The prior art

In the case of most previously proposed tubular nib-type pens or writing devices the helical venting channel is incorporated in the attachment screw thread by providing a helical groove with a greater pitch than the attachment screw thread and which is cut into the latter. Such arrangements not only involve the difficulty of providing a sufficiently large equalization or compensation chamber but also the disadvantage that a clogging of ink, more particularly India ink, in the attachment screw thread leads to difficulties in removing the nib for interchanging it with another nib.

Furthermore, arrangements have already been proposed, in the case of which the helical venting channel is arranged separately from the attachment screw thread. However, such constructions which have been proposed involve not only a relatively complicated design but also suffer from the basic disadvantage that the nib and the holding shank of the tubular nib pen must be made to match so that it is necessary to provide a complete tubular nib-type pen as a hole and is not possible to provide for the interchange of individual parts in other previously proposed tubular nib-type pens.

SUMMARY OF INVENTION

One aim of the present invention is to provide a tubular nib-type pen in the case of which it is possible to provide for an improved construction of the venting channel without involving incompatibility with most tubular nib-type pens already existing.

In order to achieve this and other aims the present invention provides a tubular nib-type pen of the above-mentioned type which has the feature that the holding shank has a female screw thread extending axially over the venting channel section and with the attachment screw thread at the rear end of the nib forms the screw connection between the holding shank and the nib and in front of the attachment screw thread of the nib on its cylindrical shaft, the external diameter of the latter corresponds to the internal diameter of the holding shank, and there is a helical groove with the same pitch as the attachment screw thread is arranged with an offset of an uneven multiple of its pitch in relation to the attachment screw thread.

With this feature the threads of the holding shaft slide on the screw threads of the helical groove of the nib shank on screwing the latter in so that the respective screw groove lying on top of one another forms the helical venting channel.

The particular advantage of the arrangement in accordance with the invention is to be found in the fact that it can be used with all previously proposed tubular nib-type pens, whose holding shaft comprises a plain internal bore, that is to say practically all tubular nib-type pens in the case of which the venting channel or duct is cut additionally into the attachment thread. In order to put the present invention into practice in the case of such holders for tubular nibs it is only necessary to screw in a new nib.

For forming a limit in abutment on screwing the nib into the holding shank there is the provision, in accordance with a further development of the invention, of an annular shoulder in the holding shank which abuts against the end of the nib.

Since in the case of the conventional production of nibs as injection molded parts it is impossible to avoid a certain lack of roundness in the screw thread groove of a few hundreths of a millimeter, while the nib should have a good fit in the holding shank, it is possible to provide in accordance with a further feature of the invention, at the front end of the helical groove and the nib an annular shoulder, which is provided with an axial hole for connecting the venting channel with the atmosphere, and which serves as a sliding bearing for the holding shank which is provided with a corresponding turned groove, in order to relieve the relatively short attachment screw thread at the rear end of the nib. The matching of the turned groove and the annular shoulder and their precise circular form can in fact be attained with a substantially higher degree of accuracy than roundness adjacent to the thread groove.

In order to obtain a particularly effective sealing action between the turns of the venting channel inter se, there is the provision in accordance with a further feature of the invention of a construction in which the threads of the holding shank and its groove of the nib shank can slide over each other since they are cut off in accordance with plain surfaces.

It is advantageous to provide between the venting channel and the attachment screw thread in the rear part of the nib shank a longitudinal or annular groove on the latter, adjacent to which the connection hole leading to the ink channel is provided. In this case this groove can also serve as a molding on surface in the case of production of a nib in accordance with the invention by injection molding.

An embodiment of the invention, diagrammatically shown in the FIGURE of the drawing, will now be described to explain the invention together with further features and details.

The FIGURE represents a longitudinal section through the front part of a tubular nib-type pen in accordance with the invention with the front end of the holding shank 1 and the nib screwed into it.

DESCRIPTION OF PREFERRED EMBODIMENTS

The holding shank 1 is provided with a female screw thread 3, and has at its end an inwardly directed annular shoulder 4 serves as an abutment for a end of the nib 2.

The nib 2 comprises a front part 8 of reduced shape which has in it a receiving hole 9 for the insertion of a nib tube that is in communication with the cylindrical inner space 7. This space 7 can serve both as a channel or duct for the ink and also for receiving a conventional drop weight with a cleaning pin or needle. The annular shoulder 10 at the end of the receiving hole 9 serves as a terminal abutment for the nib tube which is mounted in the hole 9.

In the shank 6 of the nib tube adjacent to an annular shoulder 11 a helical groove 13 is provided, which is offset by an uneven multiple of half its pitch in relation to an attachment thread 17, with the same pitch, provided at the end of the nib tube. Owing to this feature on screwing in the attachment screw thread 17 into the female screw thread 3 of the holding shank the flattened threads 31 of the holding shank slide over the also flattened screw threads 32 on the shank of the nib tube so that the associated threads jointly form a helical venting channel 33.

This venting channel 33 is connected via a groove 15 between the helical groove 13 and the attachment screw thread 17 and a hole 16 on the one hand with the ink channel 7 and on the other hand via a hole 12.

The holding shank 1 has at its front end a turned groove 5 whose internal diameter corresponds exactly to the external diameter of the annular shoulder 11 so that this annular shoulder 11 serves as a sliding bearing for the holding shank 1.

If a nib constructed in accordance with the invention is used with prior art tubular nib-type pens such a groove 5 produced by turning is generally not provided. In such a case the annular shoulder 11 can serve advantageously as an abutment for the front end of the holding shank, this would then correspond to an arrangement which would be obtained by cutting off the holding shank 1 at arrow 18 in the FIGURE.

If a conventional tubular nib pens is used in conjunction with the nib constructed in accordance with the invention and if the holding shank is so constructed as if the holding shank 1 were to be cut off as indicated by arrow 18 in the FIGURE. the annular shoulder 11 then takes over the function of the annular shoulder 4 since in the case of such conventional holding shanks this terminal abutment 4 is not provided either.

The fact that in the case of the use of a nib in accordance with the invention with holding shanks of conventional tubular nip pens the sliding bearing means between the turned groove and the annular shoulder 11 is not provided, is not of substantial importance since a sliding engagement between the screw threads 31 and 32 can already be provided for with a very high degree of precision, although there is not the same high accuracy as is the case with the sliding bearing already mentioned.

I claim:

1. A tubular nib-type pen structure comprising in combination:

a hollow holding shank; and a hollow tubular nib having a writing end and including a space constituting a reservoir for writing fluid, said nib being inserted into the shank with its writing end protruding from one end of the shank, said shank having an internal threading extending along substantially the entire length of the shank and said nib having at its other end an external threading engageable with the shank threading for releasably retaining the nib in the shank, said nib further having in and along its outer wall a helical groove axially separated from the threading on the other end of the nib by a gap and extending along and parallel to the threading on the shank, the positions of the shank threading and of the helical groove being correlated so that the valleys between the turns of the shank threading and the groove turns are in registry thereby forming a continuous venting channel along the major portions of the lengths of the shank and the nib, said channel terminating at one end at said gap in communication therewith said nib having at the other end of the venting channel an outwardly protruding shoulder and said holding shaft having a juxtaposed inner wall portion resting against said shoulder as a bearing, said nib shoulder including an opening therethrough connecting said other end of the venting channel with the atmosphere, a wall portion of the nib in said gap including a vent hole communicating with the reservoir in the nib, thereby constituting an equalization passage between the reservoir and the atmosphere.

2. The pen structure according to claim 1 wherein the holding shank has at said other end an inwardly protruding flange, the adjacent nib portion abutting against said flange in axial direction for limiting screwing of the nib into the shank to a position in which the nib groove and the shank threads are in registry.

3. The pen structure according to claim 1 wherein said wall portion of the nib in said gap is recessed to permit sliding of the threading on the inner wall of the holding shank relative to the nib, said vent hole being disposed in said recessed wall portion.

* * * * *